March 31, 1953 H. W. PILCHER 2,633,231
ROTATABLE CROP FEEDER WITH BEARINGS
FOR RETRACTING FINGERS
Filed Sept. 18, 1950 2 SHEETS—SHEET 1

INVENTOR.
HAROLD W. PILCHER

ATTORNEYS

March 31, 1953 H. W. PILCHER 2,633,231
ROTATABLE CROP FEEDER WITH BEARINGS
FOR RETRACTING FINGERS
Filed Sept. 18, 1950 2 SHEETS—SHEET 2

INVENTOR.
HAROLD W. PILCHER
ATTORNEYS

Patented Mar. 31, 1953

2,633,231

UNITED STATES PATENT OFFICE 2,633,231

ROTATABLE CROP FEEDER WITH BEARINGS FOR RETRACTING FINGERS

Harold W. Pilcher, Moline, Ill., assignor to Deere & Company, Moline, Ill., a corporation of Illinois Application September 18, 1950, Serial No. 185,440

18 Claims. (Cl. 198—211)

1

This invention relates to a material-handling device and more particularly to a rotatable device of the feeder or beater type which finds its greatest utility in the handling of crops in agricultural machines, such as combines or the like in which feeders or beaters are utilized to advance crops to crop-treating mechanism.

The preferred embodiment of the invention disclosed herein was designed primarily for use in material-handling mechanism of the type characterized by an auger feeder as used on the platform of a combine. In the particular combine referred to, an example of which is disclosed and claimed in assignee's co-pending application, Serial No. 687,875, filed August 2, 1946, now Patent No. 2,529,180, the combine has a longitudinal relatively narrow body opening at its forward end as a feeder house having a forward opening across and laterally beyond each side of which the harvesting platform extends. A pair of oppositely wound auger feeders receive cut crops delivered rearwardly over the cutter bar by the harvester reel and move these crops inwardly toward the feeder house. The inner terminal ends of the augers are spaced apart axially as respects the axis of rotation of the auger and the space between these terminal ends corresponds generally to the width of the feeder opening. In the construction referred to in said co-pending application, the auger is provided with an integral tubular portion that extends across this space, and this portion has therein a plurality of perforations. A fixed shaft is disposed within the perforated portion, which may be termed a drum, and pivotally carries the inner ends of outwardly extending crop-handling fingers, which fingers project respectively outwardly through the perforations in the drum wall. As the auger and drum rotate, the fixed shaft provides a fixed axis about which the fingers swing. The action of the outer end portions of the fingers is one of combined reciprocation and oscillation, whereby the fingers alternately extend and retract and serve as means for directing crops rearwardly into the feeder opening.

The construction referred to in the co-pending application was found to be quite noisy in operation, because no special provision was made for carrying the fingers in the drum wall, with the result that the fingers would sharply strike the wall portions defining the perforations.

According to the present invention, the noise problem is eliminated by the provision of novel bearings for carrying the fingers in an individual manner. It is an important feature of the improved bearings to accommodate the fingers for both reciprocation and oscillation. To this extent, each bearing comprises an apertured member for slidably carrying the finger for reciprocation and each bearing is mounted by a mounting element on the drum wall for rocking about an axis transverse to the path of reciprocation, thereby accommodating oscillation of each finger. The bearings are inexpensively and simply constructed and are preferably removably attached to the drum wall so that they can be replaced when the necessity therefor arises. A further feature of the mounting of the bearings is the recessing of the bearings in the drum apertures. A still further feature of the removability of the mounting elements is that these mounting elements may be individually removed from the outside of the drum, making repairs and replacements relatively easy.

It is an object of the invention to provide bearing means and mounting elements therefor as replacement elements for utilization in combines or other machines that have heretofore utilized the old type of fingers and finger mountings.

The foregoing and other important objects and desirable features inherent in and encompassed by the invention will become apparent as a preferred embodiment of the invention is fully disclosed in the following detailed description and accompanying sheets of drawings, in which Figure 1 is a plan view of the forward portion of a self-propelled combine equipped with material-handling mechanism of the type generally referred to above;

Figure 1:
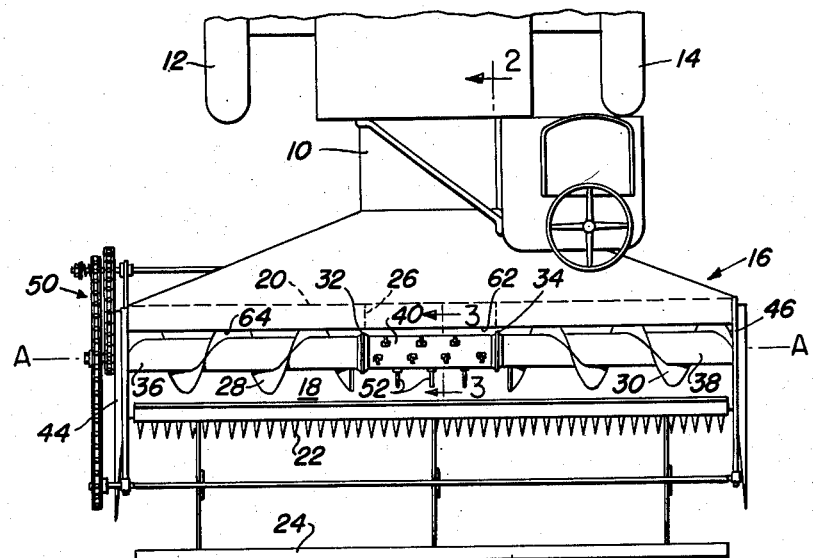

As mentioned above, the preferred embodiment of the invention forming the subject matter of this application is primarily adapted for use in a combine, and it will therefore be described with a combine of one well-known type for its background. Such combine as illustrated in Figure 1 may be of the self-propelled type having a longitudinal body 10 carried for travel over the field by a plurality of wheels, two of which are shown at 12 and 14. The forward end of the body 10 adjoins a transverse platform structure designated generally by the numeral 16.

This platform structure comprises an elongated auger trough 18 having an upright rear wall 20 and a forward or leading edge provided with a cutter bar 22 of conventional construction. A reel 24 cooperates with the cutter bar for cutting grain or other standing crops and for delivering such crops rearwardly over the cutter bar to the auger trough 18.

As will be seen in Figure 1, the length of the auger trough 18—or the width of the platform structure 16—is considerably greater than the width of the feeder house or body 10. The upright rear wall 20 of the auger trough 18 is open at 26 (Figure 2) to provide a feed opening communicating with the feeder house. The bottom of the auger trough 18 extends completely across the feeder house opening and laterally at each side thereof. A pair of oppositely wound helical conveyors or augers 28 and 30 feed inwardly from opposite outer ends of the platform structure to feed cut crops centrally for ultimate delivery through the feeder house opening 26. These augers respectively have inner terminal ends 32 and 34 substantially coincident with opposite side walls of the body 10.

In the preferred form of auger conveyor structure illustrated, the augers 28 and 30 are respectively constructed with central tubular cores 36 and 38. The tubular core structure is carried across the terminal ends 32 and 34 of the augers in the form of a hollow structure such as a drum 40 flanged at opposite ends and secured to the terminal ends of the augers by means such as that suggested at 42 in Figure 4. The drum 40 is therefore rotatable with the augers 28 and 30 about the axis A—A as designated in Figures 1 and 4. The platform structure 16 has opposite end walls 44 and 46 and opposite ends of the auger structure are journaled in these walls by means such as that designated generally by the numeral 48 in Figure 4. The auger conveyor structure and associated drum 40 are driven by any suitable means, which may also include means for driving the reel 24, as illustrated at 50 in Figure 1. These details are relatively unimportant and are described here only for the purpose of providing a background for the invention.

Figure 2:
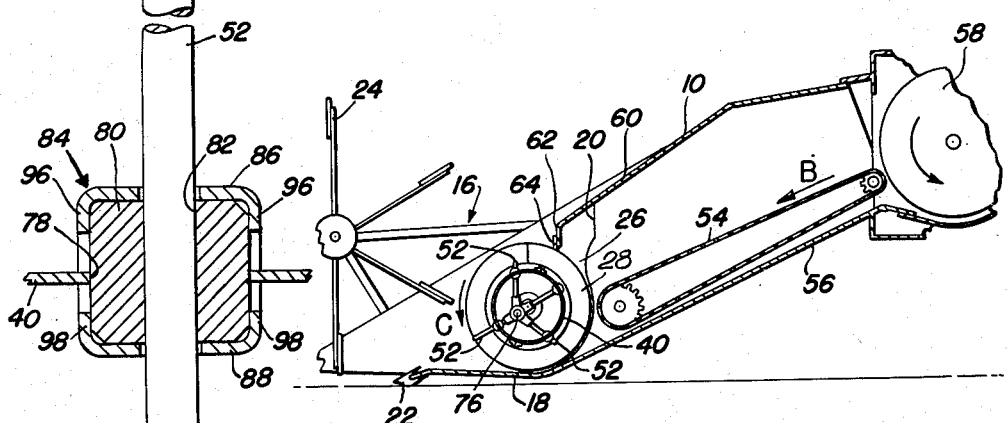
Figure 2 is a longitudinal sectional view taken substantially on the line 2—2 of Figure 1.

As a further part of what may be termed conventional structure in view of the disclosure of the co-pending application referred to above, the drum 40 is provided with a plurality of material-handling members or crop-engaging fingers 52. In the general scheme of operation, the machine advances over a field of standing crops and the reel 24 sweeps these crops rearwardly over the cutter bar 22 onto the auger trough 18. The oppositely wound augers 28 and 30 move the cut crops toward the center or into a zone in longitudinal alinement with the feeder house 10. The rotating drum and finger structure 40—52 engages these crops, as well as those swept directly rearwardly over that portion of the cutter bar immediately ahead of the feeder house, and moves them rearwardly through the feeder house opening 26, where the crops are engaged by a conveyor 54 moving in the direction of the arrow B. The crops are thus conveyed up a bottom or floor 56 in the feeder house to a threshing cylinder or the like such as designated by the numeral 58 (Figure 2). In the construction illustrated, the feeder house 10 has a top wall 60 which includes a downwardly turned front edge 62 which is in turn coextensive with a stripper member 64 that parallels the augers 28—30 for the purpose of preventing crops from winding about the augers, all of which is generally conventional.

The foregoing completes the general description of the background or environmental structure in which the invention may be used. The following will pertain to the preferred embodiment of the invention and will be concentrated on the central tubular or drum structure 40 and reference will be made primarily to Figures 3 through 6.

Figure 4:
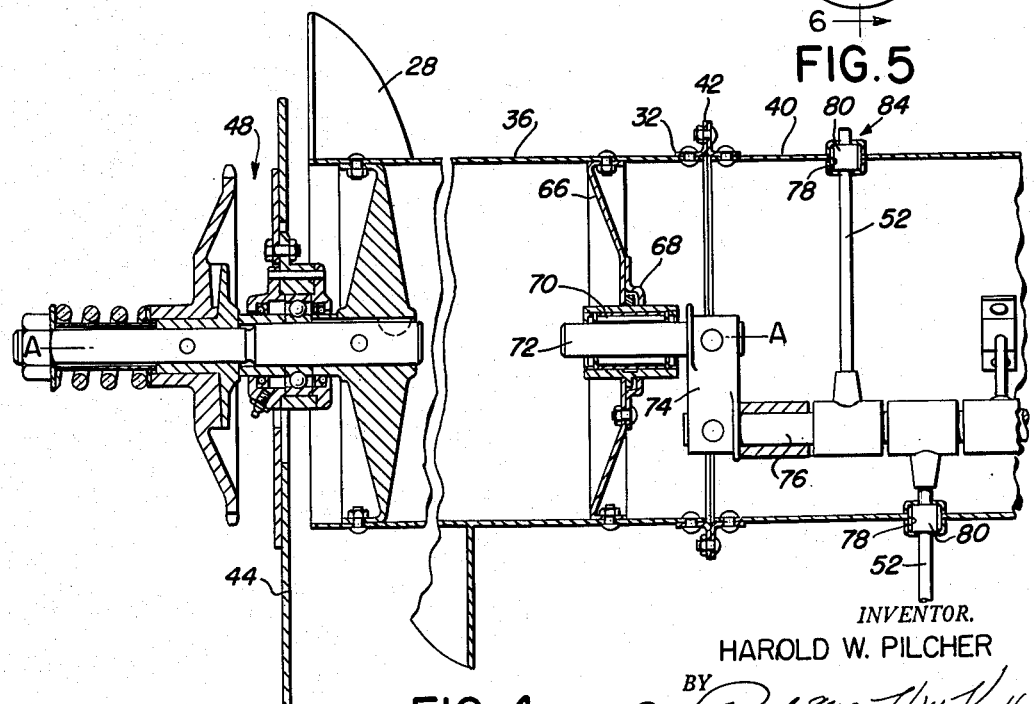
Figure 4 is a section on the line 4—4 of Figure 3, taken lengthwise through the auger and associated drum with a portion of the auger broken away to shorten the view.

As best shown in Figure 4, the terminal end 32 of the tubular core 36 for the auger 28 carries a circular member 66 having a hub 68 in which is carried a bearing 70. This bearing carries a stub shaft 72 on the axis A—A. The stub shaft is connected by a crank arm 74 to a fixed shaft 76. The shaft 76 is, of course, within the drum 40, and is eccentric with respect to the axis A—A and parallels said axis. The opposite end of the shaft 76 (not shown) may be provided with a similar crank arm and stub shaft, only in this case the stub shaft will extend axially outwardly of the auger to be fixed, for example, to the end wall 46 of the platform structure. Of importance, is the fact that the drum 40 is rotatable and the inner structure, comprising the shaft 76 and its associated crank and stub shaft, is fixed, so that the axis of the shaft 76 is always eccentric relative to the axis A—A of the auger structure 28—30—40. The details of fixedly mounting the shaft 76, or its equivalent, are relatively unimportant and any of several means, of which that shown in the co-pending application referred to above is typical, could be used.

The peripheral wall of the hollow outer structure or drum 40 is provided with a plurality of perforations or apertures 78, and the fingers 52 are pivoted to the fixed inner structure 76 and project generally radially outwardly respectively through these perforations. Stated otherwise, the portions of the drum 40 in which the perforations or apertures 78 are formed constitute portions spaced radially from the axis A—A and also spaced circumferentially about the axis A—A. Since the shaft 76 is fixed and since the axis of this shaft is eccentric with respect to the axis A—A, the fingers 52 will have movement relative to the drum partaking of both reciprocation and oscillation as the drum rotates; that is, as the drum rotates, the fingers 52 will alternately extend and retract. The direction of rotation of the drum is indicated by the arrow C in Figures 2 and 3. It will be seen that the extent of extension of the fingers 52 is greatest as the drum moves downwardly and then rearwardly over the bottom of the auger trough 18, the fingers retracting as they pass the opening 26 for the feeder house 10. The action is such that crops engaged by the fingers 52 will be stripped therefrom by the fingers as they retract into the drum 40, a result that is not unknown to those versed in the art.

As stated above, it was former practice to construct a drum and finger arrangement of this character by permitting the fingers, such as the fingers 52, to extend loosely through apertures, such as the apertures 78, in the drum. Constructions of this nature were extremely noisy in operation, since the relative looseness of the fingers permitted the fingers to strike sharply against the drum portions defining the apertures through which the fingers extended. According to the present invention, novel bearings are provided for supporting and guiding the fingers. The details of these bearings may best be seen in Figures 4, 5 and 6.

Figure 5:
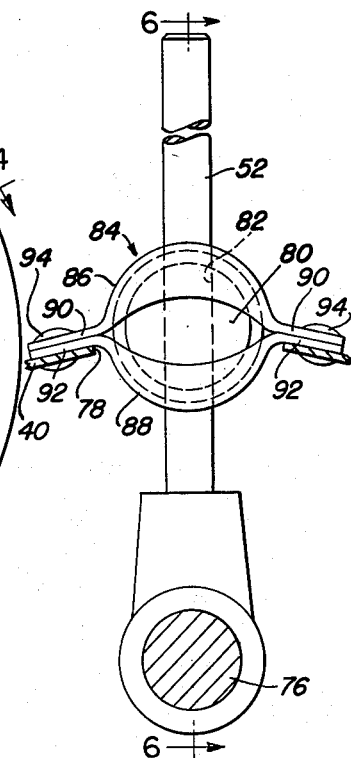
Figure 5 is an enlarged view of one of the fingers and the mounting element and bearing therefor.

Each bearing is preferably in the form of a cylindrical member 80 provided with a diametrical aperture or bore 82 through which the associated finger 52 slidably extends. Each aperture 78 is preferably rectangular in shape to accommodate its bearing 80 and such bearing is at least partly received in the aperture (Figure 5) so as to extend in part outside the drum 40 and in part inside the drum. Because of its location in the aperture 78, the bearing 80 is fixed against longitudinal or lengthwise displacement relative to the drum. Each bearing is fixed in place on the drum 40 by means of a mounting element designated generally by the numeral 84. The mounting element, of which there are several, one for each finger 52 and associated bearing 80, comprises a pair of complementary, separable halves or sections 86 and 88, each preferably semi-cylindrical, capable of assembly so as to embrace or surround the bearing 80 to carry the bearing for rocking about its principal axis. Stated otherwise, the mounting element 84 carries its bearing 80 for rocking about an axis transverse to the path of reciprocation of the associated finger 52. In the case of a cylindrical bearing such as that shown at 80, the rocking axis will be the axis of the cylindrical bearing. The sections or halves 86 and 88 may be identical when initially made, although each will have a different shape when assembled because of the curvature of the drum 40. The section 86 has a pair of apertured ears 90 and the section 88 has a similar pair of ears 92. The ears 90 and 92 are shaped to conform to the curvature of the cylindrical wall of the drum 40 and when the two sections or halves are assembled with the bearing 80 therewithin, the ears 90 and 92 are respectively registrable to receive securing means preferably in the form of removable rivets 94 which pass also through appropriate apertures in the drum 40 adjacent the associated mounting aperture 78. As shown in Figure 5, the mounting of the mounting element is such that it may be removed from the exterior of the drum.

Figure 6:
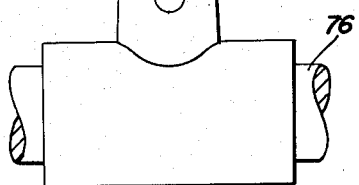
Figure 6 is a vertical sectional view taken on the line 6—6 of Figure 5.
Figure 3:
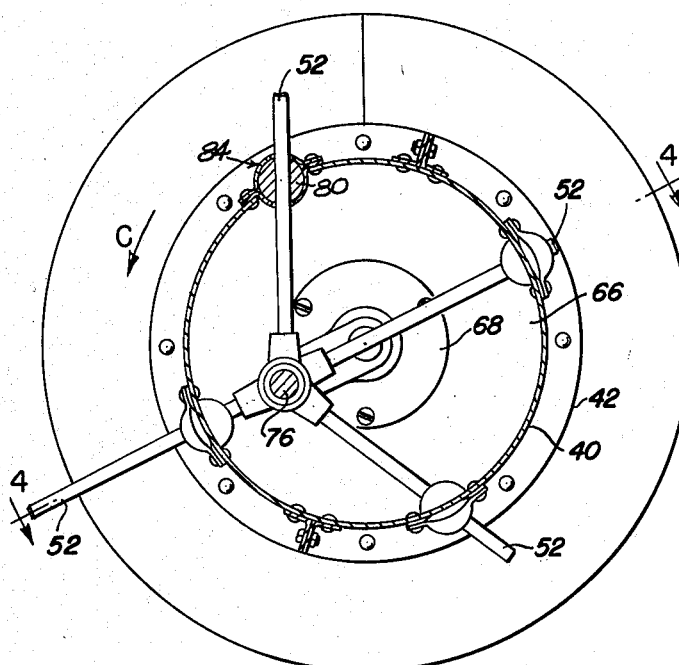
Figure 3 is an enlarged transverse sectional view taken substantially on the line 3—3 of Figure 1.

As shown in Figure 6, the mounting element section or half 86 is provided with opposite end wall portions 96, and the other mounting element half or section is provided with similar end wall portions 98. When the sections are assembled, the end wall sections 96 and 98 respectively engage opposite ends of the cylindrical bearing member 80, thus almost completely enclosing the bearing member and further confining the bearing member against shifting lengthwise relative to the drum.

In the preferred embodiment of the invention, the bearing member 80 is a steel member of considerable hardness and the element sections or halves 86 and 88 may be of sheet metal or equivalent material shaped as illustrated.

In operation, as the fingers 52 reciprocate because of the eccentricity between the shaft 76 and the axis A—A, they are slidably guided or carried by the bearings 80. Further, as the fingers oscillate because of their pivotal mounting on the fixed shaft 76, the bearings 80 may oscillate or rock about their axes as provided by the mounting elements 84. There is no lost motion or play and the operation of the drum will be comparatively silent.

The preferred construction illustrated is, it will be seen, relatively simple and inexpensive and may be easily provided as part of the original structure of a drum such as that shown or may be furnished for such drums or equivalent drums as replacement parts. Various other features of the invention not specifically enumerated herein will undoubtedly occur to those versed in the art, as likewise will numerous modifications and alterations in the preferred embodiment illustrated and described, all of which may be achieved without departing from the spirit and scope of the invention as defined in the appended claims.

What is claimed is:

1. A material-handling device, comprising: an elongated rotatable drum having its peripheral wall provided with a plurality of rectangular apertures spaced apart both lengthwise and circumferentially of the drum and each said aperture being relatively short as compared with the length of the drum; a fixed shaft extending lengthwise of and within the drum and positioned eccentrically to and paralleling the drum axis; a plurality of finger members pivoted at their inner ends to the fixed shaft and projecting outwardly respectively through the apertures in the drum wall, each of said fingers in cross section being relatively smaller than its aperture so as to pass loosely through such aperture; a plurality of individual cylindrical bearings, one for each aperture and associated finger member, each bearing being arranged with its axis parallel to the drum axis and being of such axial length and diameter as to be received by its associated aperture so that diametrically opposed portions thereof lie respectively within and outside the drum wall and fixed against shifting lengthwise of the drum, and each bearing having a single diametrical aperture therein to slidably receive its associated finger member for reciprocation of such finger member relative to the bearing and drum wall as the drum is rotated; and a plurality of individual mounting means, one for each bearing, each mounting means being secured to the drum wall and constructed to carry its associated bearing for rocking about the axis of such bearing relative to the drum wall.

2. The invention defined in claim 1, further characterized in that: each mounting means comprises a pair of complementary semi-cylindrical sections, one embracing the part of its bearing outside the drum wall and the other embracing the part of its bearings inside the drum wall; each pair of sections being secured together and to the drum wall.

3. The invention defined in claim 2, further characterized in that: each section has opposite end wall portions respectively overlapping opposite end portions of its associated bearing.

4. A material-handling device, comprising: a rotatable drum having its peripheral wall provided with a plurality of relatively small apertures arranged in both circumferentially and axially spaced relation relative to the drum axis; a fixed shaft extending lengthwise of and within the drum and positioned eccentrically to and paralleling the drum axis; a plurality of finger members pivoted at their inner ends to the fixed shaft and projecting outwardly respectively through the apertures in the drum wall, each of said fingers in cross section being relatively smaller than its aperture so as to pass loosely through such aperture; a plurality of individual bearings, one for each aperture and associated finger member, each bearing being of such size as to be received at least partly in its associated aperture so as to be partly within and partly outside the drum wall and fixed against shifting lengthwise of the drum, and each bearing being apertured to slidably receive its associated finger member for reciprocation of such finger member relative to the bearing and drum wall as the drum is rotated; and a plurality of mounting means, one for each bearing, each mounting means being secured to the drum wall and constructed to carry its associated bearing for rocking about an axis transverse to the path of reciprocation of its associated finger member.

5. The invention defined in claim 4, further characterized in that: each mounting means comprises a pair of complementary halves, one embracing the part of its bearing outside the drum wall and the other embracing the part of its bearing inside the drum wall; each pair of sections being secured together and to the drum wall.

6. The invention defined in claim 5, further characterized in that: each of said halves has opposite end wall portions respectively overlapping opposite end portions of its associated bearing.

7. A material-handling device, comprising: a hollow outer structure rotatable about an axis and having a plurality of portions fixed in radially spaced positions from said axis and spaced both axially and circumferentially relative to said axis; a fixed inner structure within the outer structure and having means providing an axis eccentric to the axis of rotation of said outer structure; a plurality of material-handling members pivoted at their inner ends to the inner structure on the axis thereof and projecting outwardly respectively in proximity to the aforesaid outer structure portions for reciprocation generally radially inwardly and outwardly relative to said outer structure portions as said outer structure is rotated relative to the inner structure; a plurality of individual bearings, one for each material-handling member, carried by the outer structure portions for rocking movement relative to said outer structure portions about axes transverse to the paths of reciprocation of the material-handling members, each bearing having means for slidably receiving its associated finger to carry such finger for reciprocation as aforesaid; and means for removably mounting the bearings respectively on the outer structure portions.

8. The invention defined in claim 7, further characterized in that: each bearing is positioned at least in part radially inwardly of its associated outer structure portion.

9. The invention defined in claim 7, further characterized in that: each bearing-mounting means is constructed and arranged for removal outwardly from its associated outer structure portion.

10. For use in a material-handling device of the character having a rotatable drum provided with perforations in its peripheral wall and a plurality of reciprocating and oscillating fingers projecting respectively outwardly through the perforations: means for carrying a finger in the drum wall, comprising a bearing having a principal axis and positionable adjacent to a drum wall perforation with said principal axis parallel to the axis of rotation of the drum, said bearing further having therein an aperture normal to said principal axis and adapted to slidably receive a finger projecting through that perforation, and a mounting element carrying the bearing for rocking about its said principal axis, said element having means thereon adapted to be affixed to the drum wall for mounting the bearing in position as aforesaid.

11. The invention defined in claim 10, further characterized in that: the bearing is in the form of a cylinder, the aforesaid principal axis is the axis of the cylinder and the aperture therein extends diametrically therethrough; and the mounting element includes means engaging the bearing to restrain the bearing against axial displacement relative to said element.

12. The invention defined in claim 11, further characterized in that: the mounting element comprises a pair of complementary separable semi-cylindrical sections fitting together and surrounding the cylindrical bearing, each section having an opening therethrough in register with the aperture in the bearing.

13. The invention defined in claim 12, further characterized in that: each mounting section has opposite end portions respectively overlapping opposite end portions of the cylindrical bearing.

14. The invention defined in claim 10, further characterized in that: the bearing is symmetrical about its principal axis, and the mounting element comprises a pair of complementary, substantially semi-cylindrical halves separably fitting together to embrace the bearing, each element half having an opening therethrough in register with the bearing aperture.

15. The invention defined in claim 14, further characterized in that: at least one of the mounting element halves is provided with an ear portion for affixation thereof to the drum wall.

16. The invention defined in claim 10, further characterized in that: the mounting element comprises a pair of complementary, substantially semi-cylindrical halves separably fitting together to embrace the bearing, each element half having an opening therethrough in register with the bearing aperture and each separable element half has a pair of apertured ears respectively registrable to receive a pair of securing means for affixation of the element halves to the drum wall.

17. A material-handling device, comprising: an elongated rotatable drum having its peripheral wall provided with a plurality of rectangular apertures spaced apart both lengthwise and circumferentially of the drum and each said aperture being relatively short as compared with the length of the drum; a fixed shaft extending lengthwise of and within the drum and positioned eccentrically to and paralleling the drum axis; a plurality of finger members pivoted at their inner ends to the fixed shaft and projecting outwardly respectively through the apertures in the drum wall, each of said fingers in cross section being relatively smaller than its aperture so as to pass loosely through such aperture; a plurality of individual cylindrical bearings, one for each aperture and associated finger member, each bearing being relatively short in axial dimension and disposed adjacent its associated drum wall aperture with its axis parallel to the drum axis, and each bearing being diametrically apertured to slidably receive its associated finger member for reciprocation of such finger member relative to the bearing and drum wall as the drum is rotated; and a plurality of individual mounting means, one for each bearing, each mounting means being secured to the drum wall and constructed to carry its associated bearing for rocking about the axis of such bearing relative to the drum wall.

18. A material-handling device, comprising: a rotatable drum having its peripheral wall provided with a plurality of apertures spaced apart both lengthwise and circumferentially of the drum and each said aperture being relatively short as compared with the length of the drum; a fixed shaft extending lengthwise of and within the drum and positioned eccentrically to and paralleling the drum axis; a plurality of finger members pivoted at their inner ends to the fixed shaft and projecting outwardly respectively through the apertures in the drum wall, each of said fingers in cross section being relatively smaller than its aperture so as to pass loosely through such aperture; a plurality of individual bearings, one for each aperture and associated finger member, each bearing being disposed adjacent its associated drum wall aperture, and each bearing being apertured to slidably receive its associated finger member for reciprocation of such finger member relative to the bearing and drum wall as the drum is rotated; and a plurality of individual mounting means, one for each bearing, each mounting means being secured to the drum wall and constructed to carry its associated bearing for rocking about an axis transverse to the path of reciprocation of its associated finger member.

HAROLD W. PILCHER.

REFERENCES CITED

The following references are of record in the file of this patent:

UNITED STATES PATENTS

| Number | Name | Date |
|---|---|---|
| 794,960 | Toogood | July 18, 1905 |
| 2,133,143 | Innes | Oct. 11, 1938 |
| 2,381,391 | Brown | July 7, 1945 |
| 2,529,180 | Oehler | Nov. 7, 1950 |

FOREIGN PATENTS

| Number | Country | Date |
|---|---|---|
| 432,370 | Great Britain | July 25, 1935 |